United States Patent
Van Gerven et al.

(10) Patent No.: US 7,621,527 B2
(45) Date of Patent: Nov. 24, 2009

(54) SHEET COLLECTING DEVICE

(75) Inventors: Antonius J. J. Van Gerven, Grubbenvorst (NL); Maurice J. C. Lemmens, Tegelen (NL); Paul G. Van Veen, Venlo (NL); Robertus L. Zweerman, Eindhoven (NL)

(73) Assignee: Océ-Technologies B.V., Venlo (NL)

( * ) Notice: Subject to any disclaimer, the term of this patent is extended or adjusted under 35 U.S.C. 154(b) by 345 days.

(21) Appl. No.: 11/261,623

(22) Filed: Oct. 31, 2005

(65) Prior Publication Data
US 2006/0181008 A1      Aug. 17, 2006

(30) Foreign Application Priority Data
Nov. 1, 2004   (NL)  .................................. 1027387

(51) Int. Cl.
*B65H 31/00*  (2006.01)
*B65H 31/04*  (2006.01)

(52) U.S. Cl. ................... 271/207; 271/209; 271/213

(58) Field of Classification Search ............... 271/207, 271/209, 213; 101/480; 400/647, 646; 270/52.18, 270/58.08
See application file for complete search history.

(56) References Cited

U.S. PATENT DOCUMENTS

| 3,807,726 | A | * | 4/1974 | Hope et al. ................. 271/207 |
| 4,300,757 | A | * | 11/1981 | Koiso et al. ................. 271/207 |
| 4,575,069 | A | * | 3/1986 | Burkhart ..................... 271/186 |
| 4,768,063 | A | * | 8/1988 | Kunishima et al. .......... 355/29 |
| 4,993,701 | A | * | 2/1991 | Tosserams ................... 271/207 |
| 5,094,441 | A | | 3/1992 | Sebileau |
| 5,240,243 | A | * | 8/1993 | Gompertz et al. ........... 271/209 |
| 6,224,529 | B1 | * | 5/2001 | Honmochi et al. .......... 493/384 |
| 6,568,865 | B1 | * | 5/2003 | Fujioka et al. ............ 400/647.1 |
| 7,121,543 | B2 | * | 10/2006 | Fujioka ..................... 271/207 |
| 2002/0074708 | A1 | * | 6/2002 | Nagata et al. ............. 270/58.08 |
| 2005/0280202 | A1 | * | 12/2005 | Vila et al. .................. 271/213 |

FOREIGN PATENT DOCUMENTS

| EP | 0 347 973 A1 | | 12/1989 |
| EP | 1 095 889 A2 | | 5/2001 |
| JP | 60-36261 A | | 2/1985 |
| JP | 05186124 | * | 7/1993 |

* cited by examiner

*Primary Examiner*—Patrick H Mackey
*Assistant Examiner*—Patrick Cicchino
(74) *Attorney, Agent, or Firm*—Birch, Stewart, Kolasch & Birch, LLP

(57) ABSTRACT

A sheet collecting device for collecting sheets leaving the printing device, which includes a delivery rack for collecting sheets, a front edge stopper for collecting the front edge of a sheet in a first position of the sheet collecting device in which the sheet is deposited on the delivery rack, and wherein the sheet collecting device can be placed in a second position in which the sheets can be deposited on the delivery rack without the intervention of the front edge stopper.

10 Claims, 8 Drawing Sheets under exercises no function and the sheet slides down-
SHEET COLLECTING DEVICE

BACKGROUND OF THE INVENTION

The present invention relates to a sheet collecting device for a printing device for collecting sheets leaving the printing device, which includes a delivery rack for collecting sheets, and a front edge stopper for collecting the front edge of a sheet in a first position of the sheet collecting device in which the sheet is deposited on the delivery rack.

Sheet collecting devices of this kind are frequently used in combination with a printer. They are generally heavy structures, inflexible and not well arranged for handling sheets of different sizes or qualities. In addition, these sheet collecting devices occupy considerable space in offices and this is particularly disadvantageous when not in use.

SUMMARY OF THE INVENTION

The object of the present invention is to obviate these and other disadvantages. To this end, according to the present invention, a sheet collecting device is provided which can be placed in a position in which the sheets can be deposited on the delivery rack without the intervention of the front edge stopper. As a result, both flat sheets and rolled-up prints can be collected with one collecting device. In another embodiment of the sheet collecting device according to the present invention, the front edge stopper is mounted at the front of the sheet collecting device and the delivery rack is mounted at the back, wherein when used in the first position the front of the sheet collecting device faces the printing device and when used in the second position the back of the sheet collecting device faces the printing device. Thus the rotation of the sheet collecting device through 180° enables the collecting device to be used for collecting rolls, for example, without any further conversion.

In another embodiment of the sheet collecting device according to the present invention, the sheet collecting device comprises a tubular frame with two substantially U-shaped tubes, a front tube and a back tube, both provided with wheels. This results in an easily movable and particularly light and hence cheap collecting device.

In another embodiment of the sheet collecting device according to the present invention, the front edge stopper comprises a slidable part, the distance of which from the top part can be adjusted. This makes the sheet collecting device particularly suitable for handling all formats of receiving sheets.

In still another embodiment of the sheet collecting device according to the present invention, a scale graduation is disposed on the non-slidable part of the front edge stopper. A scale graduation of this kind enables a reliable and accurate adjustment of the device so that practically any sheet format can be deposited without malfunction.

In yet another embodiment of the sheet collecting device according to the present invention, the front tube and back tube construction is collapsible. As a result, when the sheet collecting device is not in use it can be readily stored, thereby occupying very little space.

BRIEF DESCRIPTION OF THE DRAWINGS

These and other advantages of the sheet collecting device according to the present invention will be described in detail hereinafter and explained with reference to the following Figures, wherein.

DETAILED DESCRIPTION OF THE INVENTION

Figure 1:
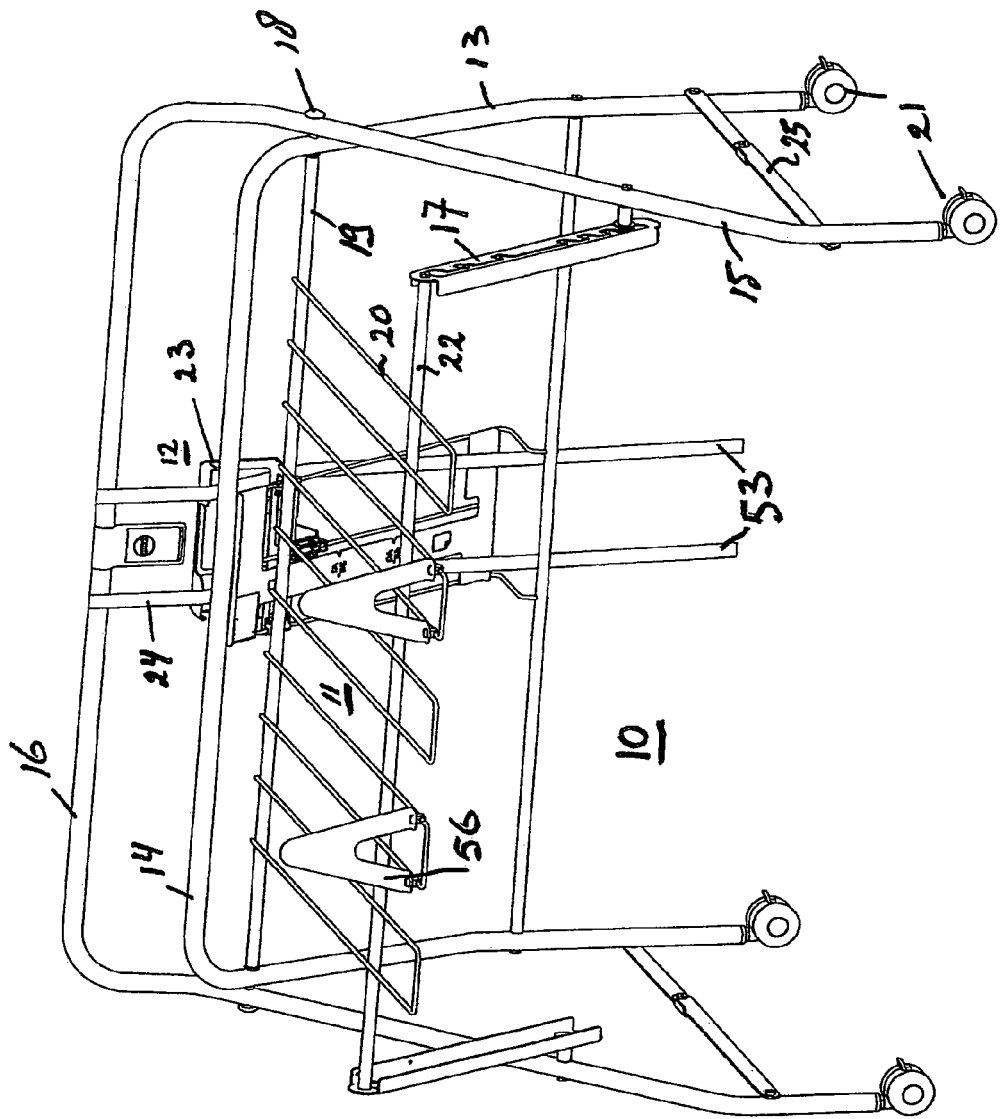
FIG. 1 is a 3D illustration of the sheet collecting device according to the present invention.

FIG. 1 is a 3D illustration of the sheet collecting device 10 according to the present invention. The frame consists of two U-shaped tubes 13, 15 of about 20 mm cross-section. The front tube 13 and the rear tube 15 are interconnected by means of a hinge 18. The hinge is constructed in the form of a bolt which so connects the two tubes that they can still pivot around said bolt. Struts 25 provide a rigid structure. At the ends of the tubes 13, 15 castors 21 are provided by means of which the sheet collecting device can easily be moved or turned.

Figure 13:
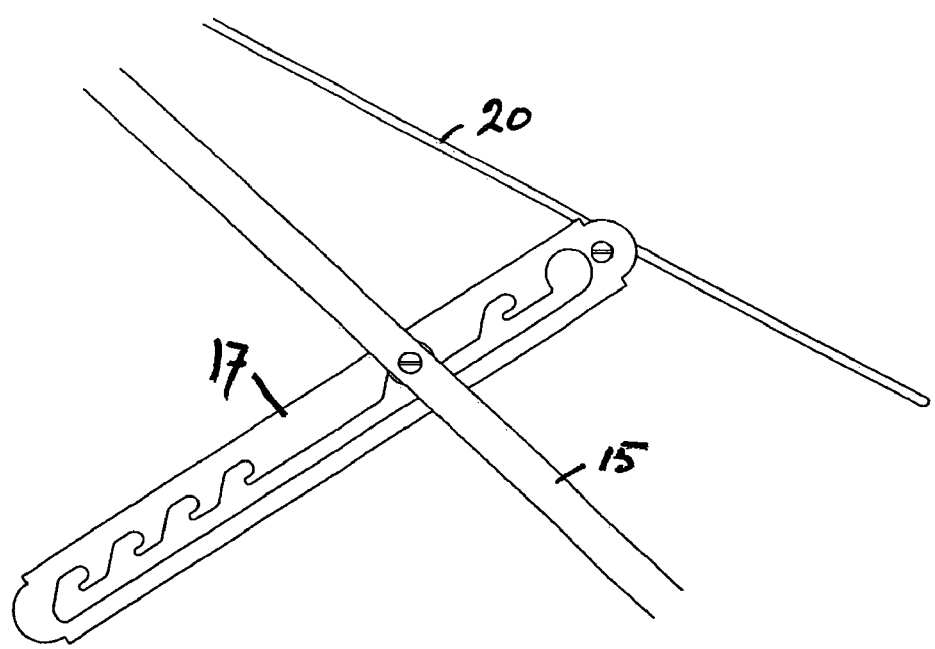
Figure 14:
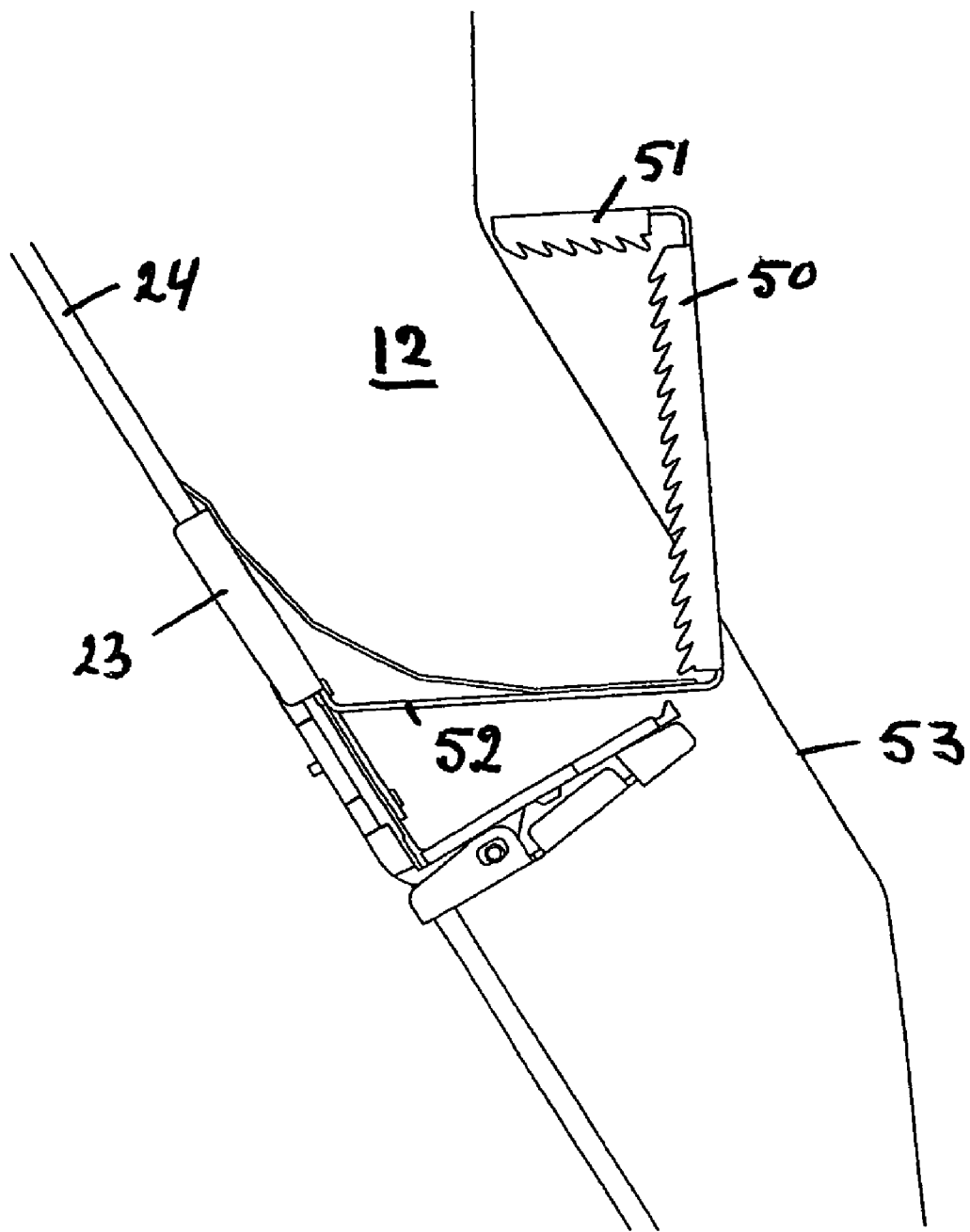
FIG. 14 is a detail of the front edge stopper in the sheet collecting device.

A hinge rod 19 forming part of the delivery rack 11 is disposed on the front tube 13 and preferably as a part of the hinge 18. A rack 20 is fixed on the hinge rod 19. This rack serves to collect printed sheets originating from a printer or copier. The delivery rack 11 is adjustable at an angle around the hinge rod 19. Two angle adjusters 17 are mounted on the back tube 15 for the angle adjustment (see FIGS. 12 and 13). Adjustment rod 22 can be moved up or down with this, so that the angle of the rack 20 to the horizon can be adjusted. In an extreme position of the angle adjuster 17 the rack 20 hangs vertically down. A front edge stopper 12 is mounted at the top part 16 of the front tube 13. This front edge stopper 12 consists of a non-slidable part 24 consisting of two rods fixed on the top part 16 (FIG. 14). The front edge stopper 12 also has a slidable part 23 by means of which a tray 52 can be moved along the rods of the non-slidable part 24. The tray 52 is provided with a vertical and horizontal toothed strip 50, 51 to ensure that sheets brought into the tray do not curl up and vanish from the tray 52. The front edge of a sheet of paper is thus retained by the teeth. A scale graduation is mounted on the non-slidable part and indicates the position of the slidable part 23.

Figure 2:
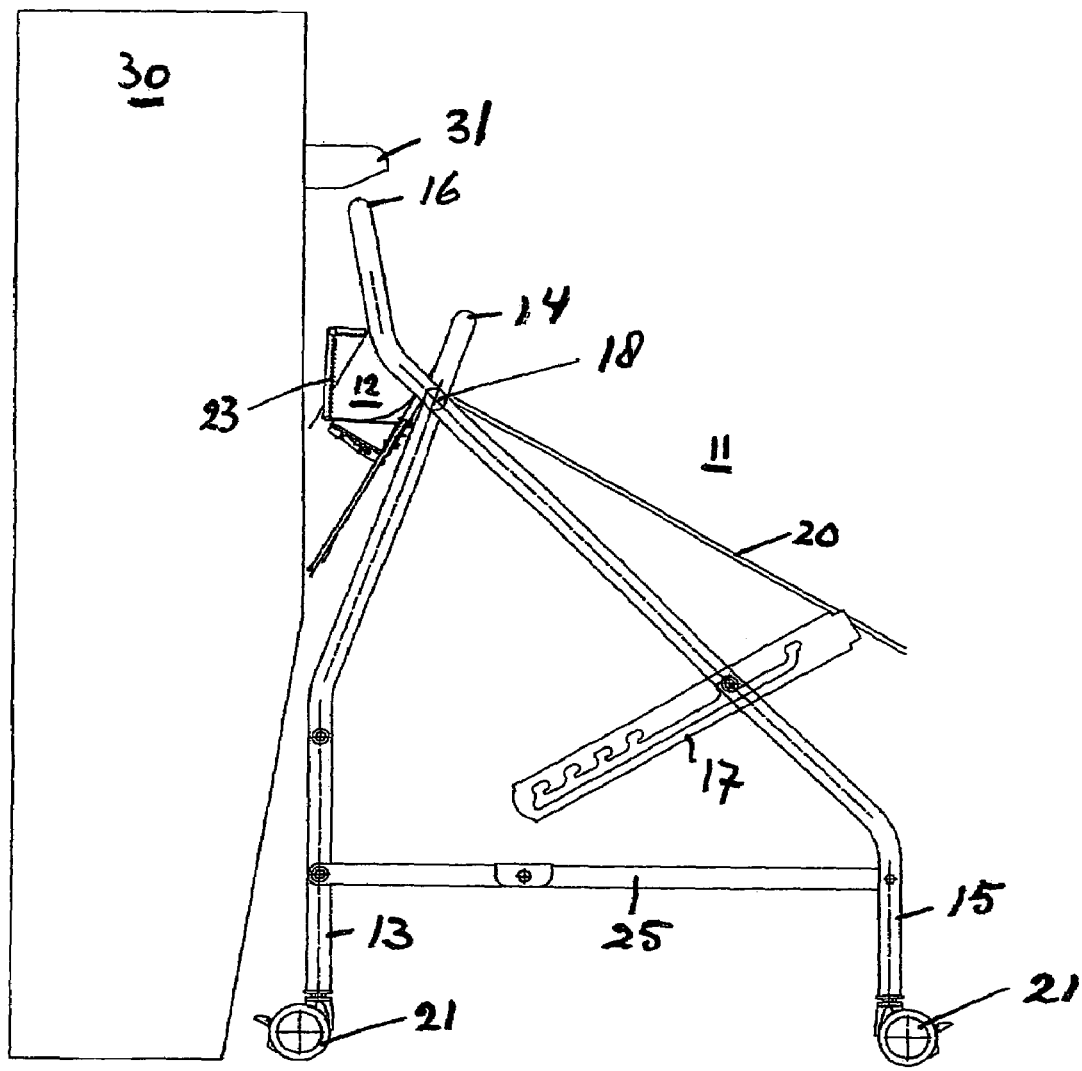
FIG. 2 is a diagram showing the sheet collecting device according to the present invention in the delivery position.

FIG. 2 is a diagram showing a printer 30 with an outlet opening 31. The sheet collecting device is in the delivery position (first position) against the printer. The numbering of the parts of the sheet collecting device is identical to the numbering used in FIG. 1.

Figure 3:
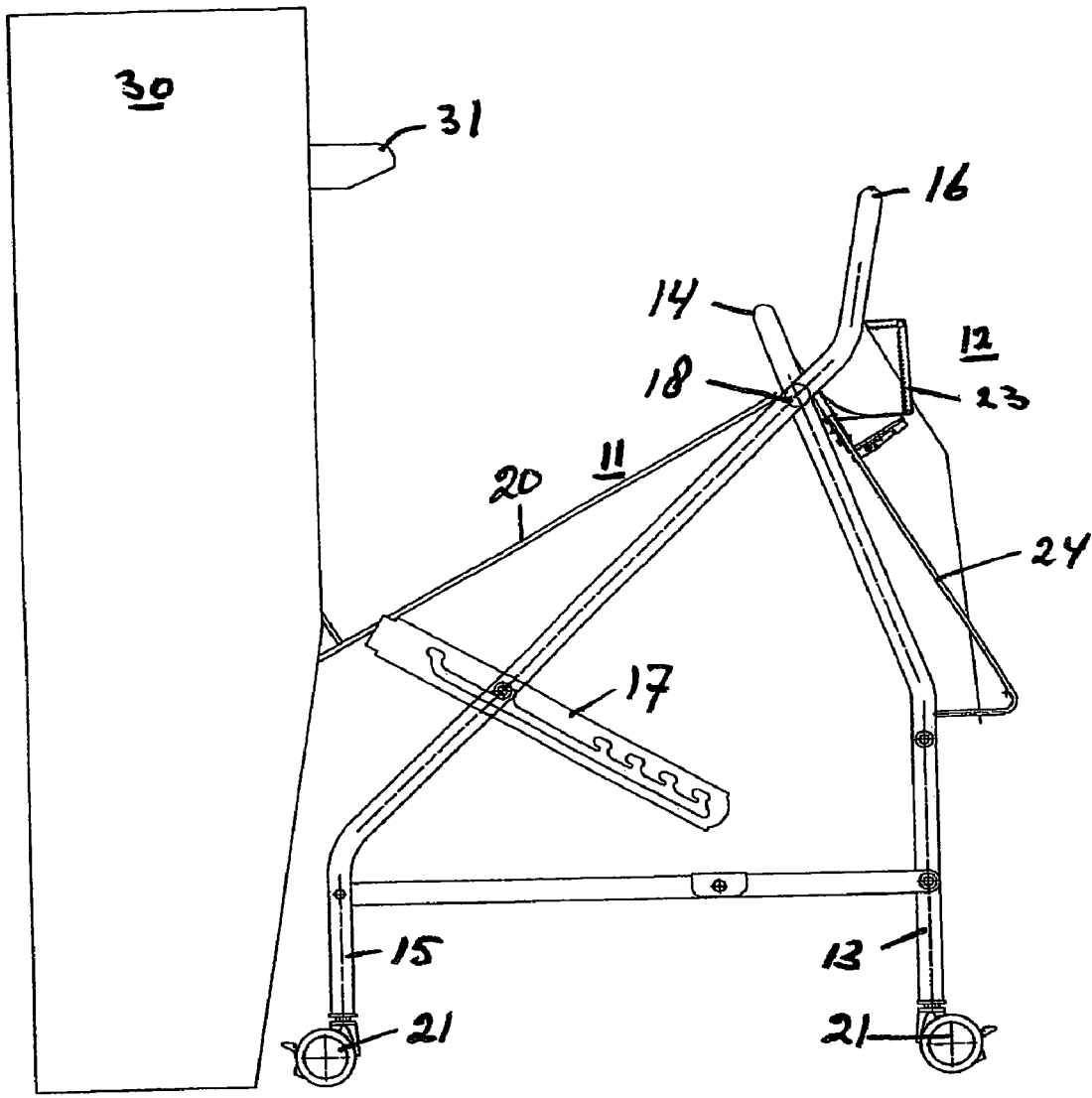
FIG. 3 is a diagram showing the sheet collecting device according to the present invention in the collecting position.
Figure 6:
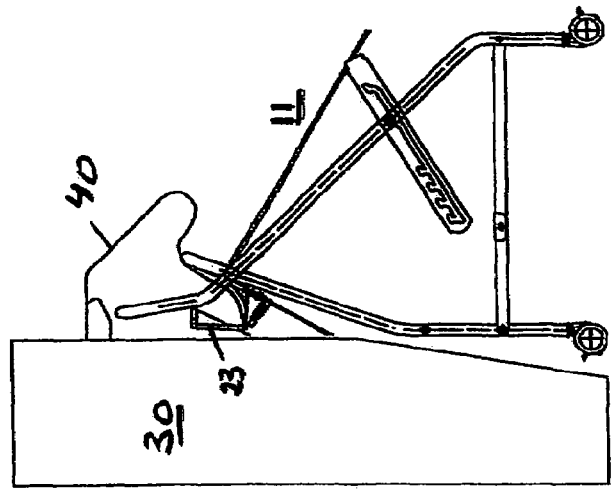
FIGS. 4 to 8 show the operation of the sheet collecting device according to the present invention in the delivery position.

FIG. 3 is again a diagram showing the printer 30 with the outlet opening 31. The sheet collecting device has now been placed in the second position (collecting position) against the printer. By means of the castors 21 the sheet collecting device can be turned through 180° in order to move the sheet collecting device from the delivery position to the collecting position.

Figure 5:
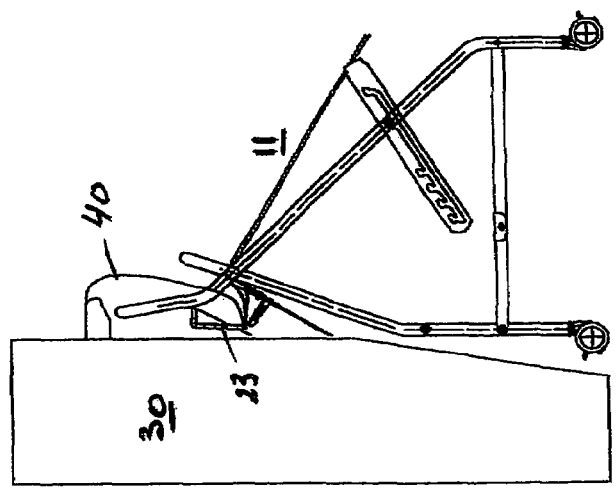
Figure 4:
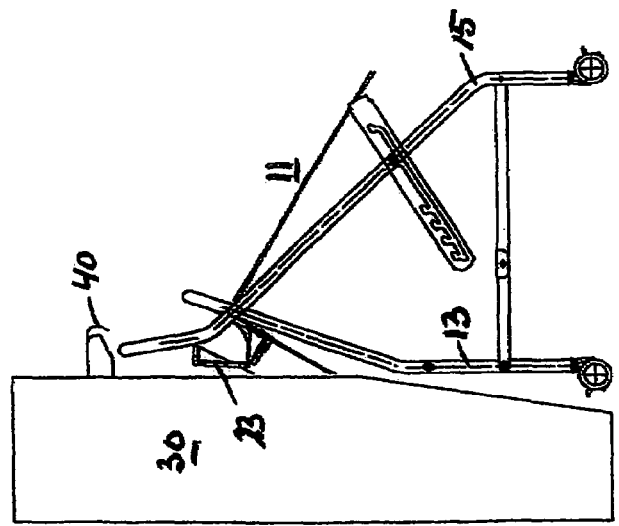
Figure 8:
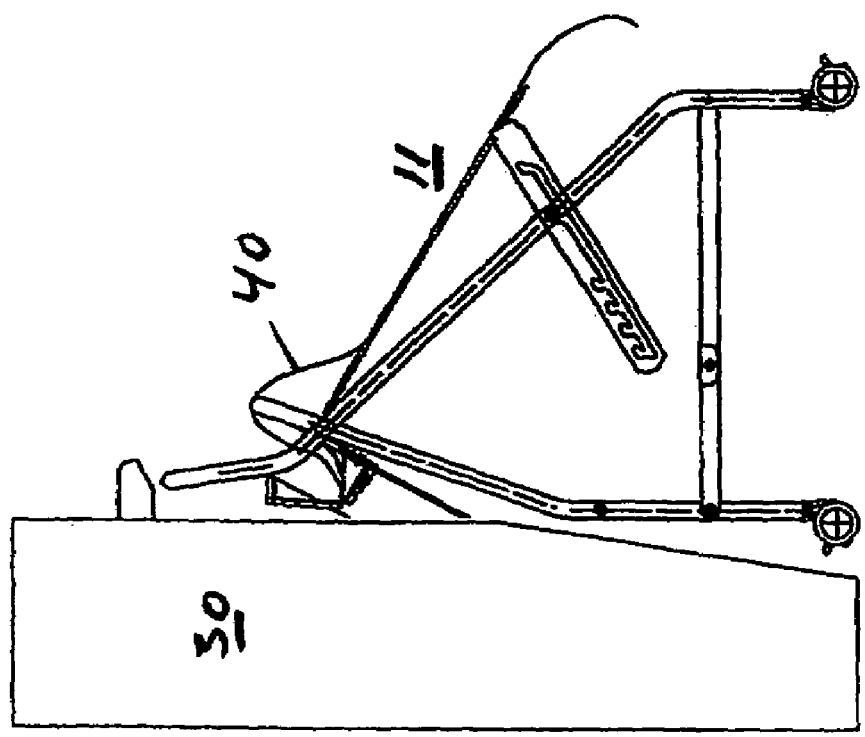
Figure 7:
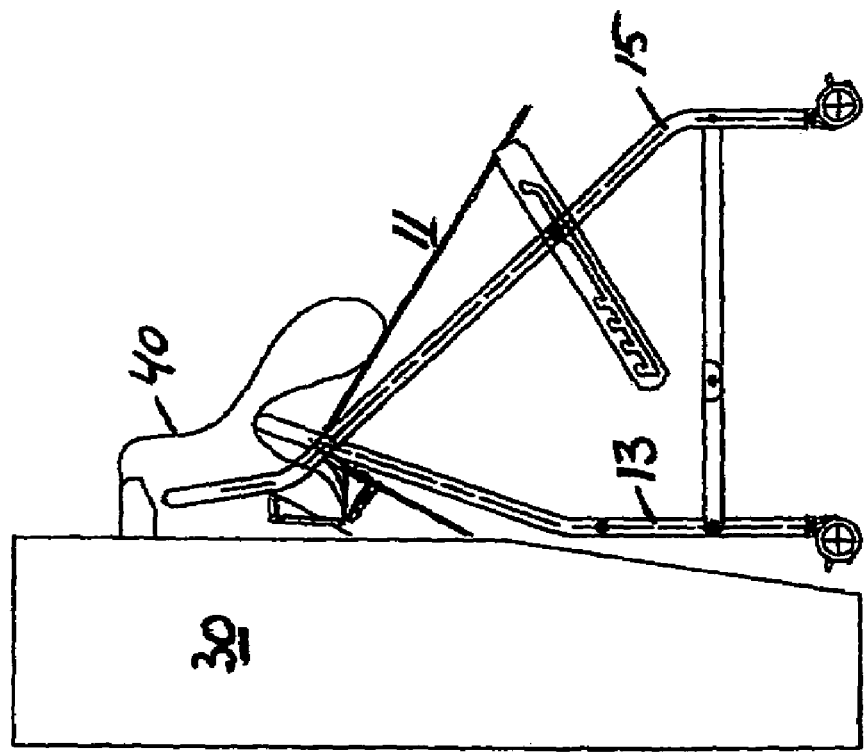

FIGS. 4 to 8 show the operation of the sheet collecting device in the delivery position. In FIG. 4, a copy sheet 40 leaves the printer 30 via the outlet opening. In FIG. 5 said sheet 40 reaches the slidable part 23 of the front edge stopper and is prevented by a toothed strip (50, 51 in FIG. 14) from any further passage or pushing into the front edge stopper. The sheet 40 then forms a slack over the top part 16 of the front tube 13 (FIGS. 6 and 7) and when the sheet is cut off it is delivered on to the rack 20 of the delivery rack 11. A large quantity of long sheets can be delivered in this way. To guide the sheet in the front edge stopper guide strips 53 (FIG. 14) of plastic can be used. If the sheets are somewhat smaller, so that they still fit on the rack 20, rear edge stoppers 56 can be used.

There is an optimum height setting of the front edge stopper 12 for each print length. This is overall such that considered from the top 14 of the front tube 13 approximately half the length of the sheet hangs down on both sides. The sheet must also have sufficient slack to be reliably deposited. A scale graduation is provided for this purpose on the non-displaceable part 23 of the front edge stopper and standard print formats are shown thereon.

Figure 12:
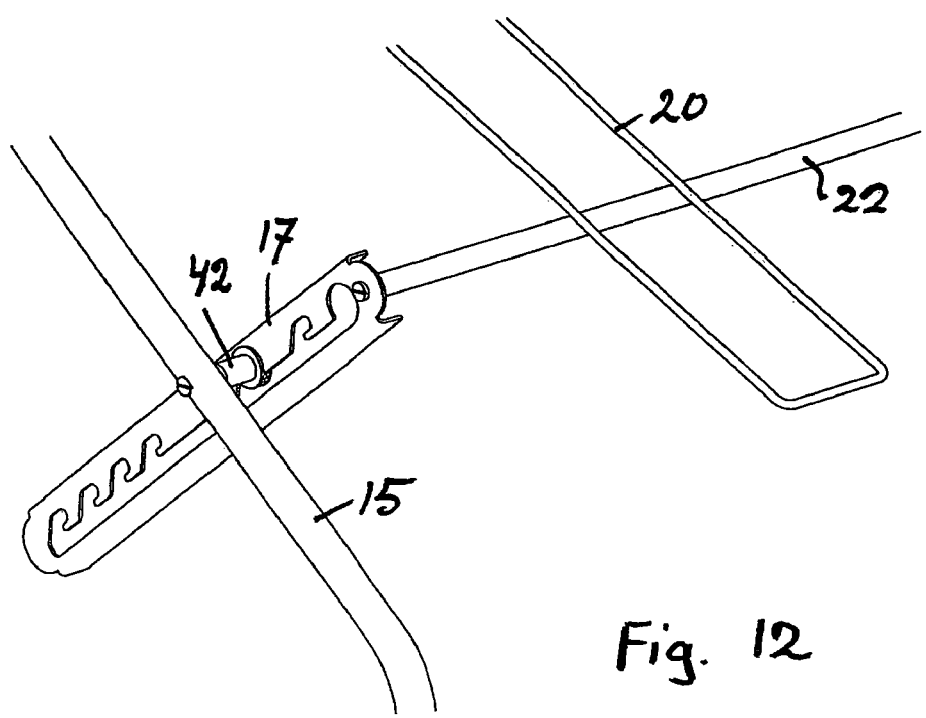
FIGS. 12 and 13 are a detail of the sheet collecting device according to the present invention.

The angle of the rack is also so adjusted that the sheets roll sufficiently over the rack but without sliding therefrom and dropping on the floor. A correctly adjusted angle also prevents curled sheets from rolling back over the rack after being cut off. The optimum position can be adjusted by reference to material data of the sheet (such as gram weight of the paper, coating, weather conditions and so on) and the adjustment mechanism (FIGS. 12 and 13). For this purpose the angle adjuster 17 is provided with specially made holes that can rest on a receiver 42. The sheets may be wet as a result of the considerable quantity of ink deposited thereon or due to high relative humidity of the air. Such sheets do not roll easily over the rack and tend to crease. For such sheets the rack must be in the lowest position. The rack can be placed in a vertical position.

Some sheets cannot be collected in the delivery position of the sheet collecting device, for example, very short sheets or sheets of thick material or material which curls very considerably. For these applications the sheet collecting device is turned through 180° and placed against the printer in the second position (collecting position).

Figure 11:
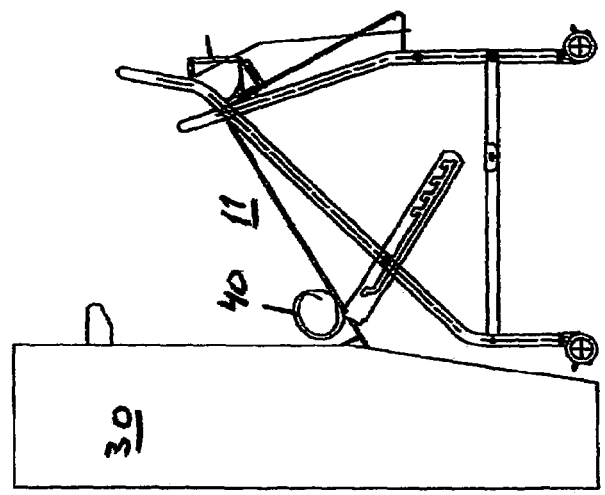
FIGS. 9 to 11 show the operation of the sheet collecting device according to the present invention in the collecting position.
Figure 10:
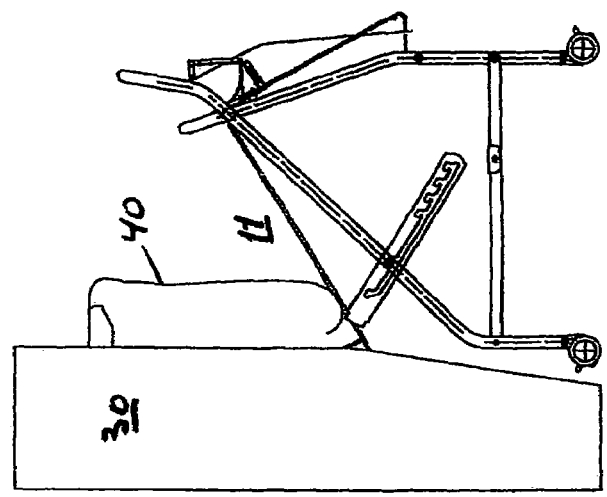
Figure 9:
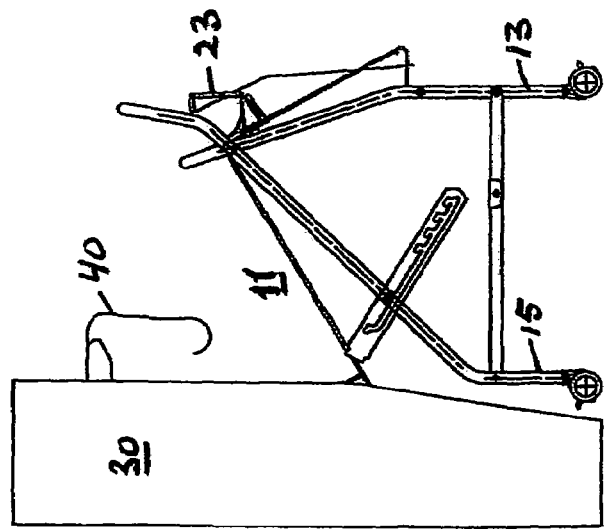

FIGS. 9 to 11 show the operation of the sheet collecting device in the collecting position. The sheet 40 now falls directly on to the rack 20 of the delivery rack 11. Here again the angle of the rack can be set to the optimal value for the material. The sheet collecting device is provided with four castors each having a braking mechanism and can thus be fixed in the correct position behind the printer. For this purpose the printer can be provided with the correct stops so that the position will always be the same. After, for example, 100 sheets have been deposited on the sheet collecting device, the rack can also be moved to a different position where the sheets can be processed further. The collecting width of the sheet collecting device is suitable for AO formats but the depth of the sheet collecting device is such that it can be pushed through current doorways. The strut 25 for this purpose is not wider than 75 cm.

The tubular frame of the sheet collecting device is also so made that the sheet collecting device can be collapsed and thus compactly stored. Thus the installation of the device requires no more than unfolding of the frame.

The present invention is not restricted to the embodiment described hereinabove and the skilled man will be able to devise many other embodiments all of which will however fall within the scope of the following claims.

What is claimed is:

1. A sheet collecting device for collecting sheets leaving a printing device, which comprises:
    a delivery rack for collecting sheets;
    a front edge stopper for collecting the front edge of a sheet in a first position of the sheet collecting device in which the sheet is deposited on the delivery rack, wherein the sheet collecting device can be placed in a second position in which the sheets can be deposited on the delivery rack without the intervention of the front edge stopper, wherein the sheet collecting device includes two substantially U-shaped front and back frame members, both provided with wheels, said back frame member containing a top part on which the front edge stopper is mounted.

2. The sheet collecting device according to claim 1, wherein the front edge stopper is mounted at the front of the sheet collecting device and the delivery rack is mounted at the back, wherein when used in the first position the front of the sheet collecting device faces the printing device and when used in the second position the back of the sheet collecting device faces the printing device.

3. The sheet collecting device according to claim 1, wherein the front edge stopper includes a slidable part, the distance of which from the top part being adjustable.

4. The sheet collecting device according to claim 3, wherein a scale graduation is disposed on the non-slidable part of the front edge stopper.

5. The sheet collecting device according to claim 4, wherein the front edge stopper comprises a toothed strip which limits, as far as possible, the sliding of the front edge of a sheet in the stopper.

6. A sheet collecting device for collecting sheets leaving a printing device, which comprises:
    a delivery rack for collecting sheets;
    a front edge stopper for collecting the front edge of a sheet in a first position of the sheet collecting device in which the sheet is deposited on the delivery rack, wherein the sheet collecting device can be placed in a second position in which the sheets can be deposited on the delivery rack without the intervention of the front edge stopper, wherein the sheet collecting device includes two substantially U-shaped front and back frame members, both provided with wheels, wherein the front and back frame members are hingedly interconnected and the delivery rack is hingedly mounted on the front frame member.

7. The sheet collecting device according to claim 1, wherein the front and back frame members have a collapsible construction.

8. The sheeting collecting device of claim 1, wherein the front and back frame members have a tubular construction.

9. The sheeting collecting device of claim 1, which is adapted to change position through 180° from a delivery position to a collecting position.

10. The sheet collecting device according to claim 6, wherein the delivery rack can be fixed at a specific angle by means of an angle adjuster.

* * * * *